United States Patent
Gabbard et al.

(10) Patent No.: US 6,646,018 B2
(45) Date of Patent: Nov. 11, 2003

(54) ANTI-LUMPING COMPOUNDS FOR USE WITH EXPANDABLE POLYSTYRENE BEADS

(75) Inventors: Ronald Gabbard, North Brunswick, NJ (US); Bernhard Schmied, Frankenthal (DE); Eric R. Weisenbach, South River, NJ (US); Robert D. Ober, Burlington, NJ (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 10/246,209

(22) Filed: Sep. 18, 2002

(65) Prior Publication Data

US 2003/0073752 A1 Apr. 17, 2003

Related U.S. Application Data

(63) Continuation-in-part of application No. 09/967,103, filed on Sep. 28, 2001, now abandoned.

(51) Int. Cl.⁷ .................................................. C08J 9/224
(52) U.S. Cl. ........................ 521/57; 106/122; 427/222
(58) Field of Search ........................ 521/57; 106/122; 427/222

(56) References Cited

U.S. PATENT DOCUMENTS

| | | |
|---|---|---|
| 3,991,020 A | 11/1976 | Alvares et al. |
| 4,174,427 A | 11/1979 | Davis et al. |
| 4,286,069 A | 8/1981 | Millington et al. |
| 4,333,970 A | 6/1982 | Blommers et al. |
| 4,361,656 A | 11/1982 | Mostaafa |
| 4,375,497 A | 3/1983 | Sandstrom |
| 4,386,133 A | 5/1983 | Blommers et al. |
| 4,398,958 A | 8/1983 | Hodson et al. |
| 4,463,032 A | 7/1984 | Arndt et al. |
| 5,935,645 A | 8/1999 | Anfuso et al. |
| 6,136,396 A | 10/2000 | Gilmer |

*Primary Examiner*—Morton Foelak
(74) *Attorney, Agent, or Firm*—Fernando A. Borrego

(57) ABSTRACT

An anti-lumping agent for use with expandable polystyrene beads is disclosed. The expandable polystyrene beads comprise a styrene or styrene derivative polymer in combination with a blowing agent. Typical blowing agents are $C_3$–$C_6$ hydrocarbons, with pentane being especially preferred. The anti-lumping agents include block copolymers formed from blocks of ethylene oxide and propylene oxide. Preferably, the copolymers have a number average molecular weight of from about 4,000 to 15,000, and a hydrophilic-lipophilic balance number of from about 16 to 29. The anti-lumping agents significantly reduce the lumping potential of the expandable polystyrene beads, especially when they are expanded to low densities of from about 1.5 to 0.75 lbs. per cubic foot, and more preferably to densities of from about 1.2 to 0.85.

13 Claims, No Drawings

ANTI-LUMPING COMPOUNDS FOR USE WITH EXPANDABLE POLYSTYRENE BEADS

RELATED APPLICATIONS

This application is a continuation-in-part of Ser. No. 09/967,103, filed Sep. 28, 2001, abandoned.

FIELD OF THE INVENTION

This invention relates generally to expandable polystyrene beads and, more particularly, to an anti-lumping agent useful for the formation of expandable polystyrene beads and low density foams formed therefrom.

BACKGROUND OF THE INVENTION

Methods for the production of expandable polystyrene beads are well known. Such expandable beads generally comprise a mixture of an expandable styrene or styrene derivative polymer and a blowing agent. The expandable polystyrene beads are generally initially formed into beads of relatively small size having a diameter of from about 0.2 to 4 millimeters. The beads are generally formed in a suspension polymerization reaction. The blowing agent is introduced into the beads either during or after the polymerization reaction. The blowing agent is generally homogeneously dispersed within the polymer and the blowing agent may be, in general, a hydrocarbon which is gaseous or liquid under normal conditions and which does not dissolve the polymer. In addition, the boiling point of the blowing agent must be below that of the softening point of the polymer.

Typically, the expandable polystyrene beads go through at least a two-step process prior to molding. In the first step, the expandable polystyrene beads are expanded to form what are known as "prills" or as a "pre-puff". This step comprises heating the beads to a temperature above their softening temperature and thereby above the boiling point of the blowing agent resulting in vaporization of the blowing agent and expansion of the beads to form individual particles of foam prills. These prills are quite fragile and prior to molding in the second step it is generally necessary to allow the prills to age for a period of time. To age the prills they are maintained under a normal atmosphere. During the aging process blowing agent within the prills diffuses out and air from outside diffuses into the prills. Once the prills have aged they can be placed in a mold and heated again such that the prills expand to fill the molding space and form a molded object. During this period the prills expand and fuse or adhere to each other to form the molded object. The molded objects can either be large blocks which are subsequently cut with a hot wire cutter into sheets or the prills can be molded directly into a particular shape.

Increasingly manufacturers of molded expanded polystyrene are attempting to shorten the expansion time frame and to mold increasingly lower density foams, thereby leading to an increase in profitability. One negative result of expanding foams to lower densities is that as the density of the foam decreases there is a significant increase in "lumping" of the prills. This problem is especially severe for expandable polystyrene beads that include low levels of blowing agents. Lumping is defined as the expandable polystyrene beads fusing together during the initial expansion step, which results in formation of large lumps of prills. These large lumps create at least two problems. First, the expansion process becomes difficult to control because of the formation of these large lumps. The second problem is that if the lumps are sufficiently large enough the material becomes unusable for the subsequent molding steps. In an attempt to control this lumping phenomenon, a number of external coatings have been utilized. Some examples of commonly used external coatings include zinc stearate, glycerol mono stearate, ethylene-bis stearamide (acrawax), and silica. Unfortunately, these commonly used lubricants are not successful in preventing lumping when the expandable polystyrene beads are expanded to very low densities.

Thus, it would be very advantageous to provide an anti-lumping compound that could be utilized with expandable polysytrene beads containing low levels of a blowing agent that would permit these beads to be expanded to very low densities previously not routinely obtainable.

SUMMARY OF THE INVENTION

In general terms, this invention provides expandable polystyrene beads having a reduced lumping tendency. In particular, this invention provides a class of anti-lumping agents for use with expandable polystyrene beads which significantly reduces lumping when expanding the polystyrene beads into low-density foams of from about 1.5 to 0.75 pounds per cubic foot (pcf), and more preferably from about 1.2 to 0.85 pcf. This invention also finds special utilization when preparing expandable polystyrene beads having low levels of blowing agents.

In a first embodiment, the present invention is an expandable polystyrene bead comprising an expandable styrene or styrene derivative polymer and from about 2 to about 5% by weight, based on the total weight of the bead, of a $C_3$ to $C_6$ hydrocarbon blowing agent, wherein the bead is coated with an anti-lumping agent comprising a block copolymer of propylene oxide and ethylene oxide blocks, said block copolymer comprising from about 80% to 65% ethylene oxide and from about 20% to 35% propylene oxide, and having a hydrophilic-lipophilic balance (HLB) value of from about 16 to 29.

In a second embodiment, the present invention is a method for the formation of an expandable polystyrene bead comprising the steps of: forming an expandable polystyrene bead containing from about 2% to about 5% by weight, based on the total weight of the bead, of a $C_3$ to $C_6$ hydrocarbon blowing agent; and coating the expandable polystyrene bead with an anti-lumping agent comprising a block copolymer comprising blocks of ethylene oxide and propylene oxide, wherein the block copolymer comprises from about 80% to 65% ethylene oxide and from about 20% to 35% propylene oxide, and has an HLB value of from about 16 to 29.

These and other features and advantages of this invention will become more apparent to those skilled in the art from the detailed description of a preferred embodiment.

DETAILED DESCRIPTION OF A PREFERRED EMBODIMENT

In general terms, this invention provides expandable polystyrene beads having a reduced lumping tendency. In particular, this invention provides a class of anti-lumping agents for use with expandable polystyrene beads that significantly reduces lumping when expanding the polystyrene beads into low density foams of from about 1.5 to 0.75 pcf. This invention also finds special utilization when preparing expandable polymer beads having low levels of blowing agents.

The expandable polystyrene beads are generally formed via the well known aqueous suspension method wherein the monomers are polymerized and combined with a blowing agent and other additives to form the beads. The beads are then separated from the aqueous portion of the suspension, washed and dried. In at least a first expansion step the beads are heated, usually via steam, to a temperature above the boiling point of the blowing agent. This heating causes vaporization of the blowing agent and expansion of the beads into a form known as a prill or prepuff. The prepuff is then allowed to age for a sufficient period of time, usually suspended in mesh bags. During the aging process external air equilibrates across the prepuff and some residual blowing agent leaves the prepuffs. The prepuff is then placed into a closed mold and heated again to form a shaped object, be it a block or a more complex shape. In some procedures the prepuffs are expanded 2 to 4 times prior to their use in the closed mold.

In the aqueous suspension polymerization reaction the monomers used to form the polymer comprise styrene or styrene derivatives. The styrene derivatives include: alpha-methylstyrene, o-methylstyrene, m-methylstyrene, p-methylstyrene, ar-ethylstyrene, ar-vinylxylene, ar-chlorostyrene, and ar-bromostyrene. The derivatives may include minor amounts of divinylbenzene, methylmethacrylate, or acrylonitrile. The preferred monomer is styrene. The monomer or mixture of monomers is suspended in an aqueous solution and polymerized. The blowing agent is generally added during the suspension polymerization, but can be added during later processing steps. The suspension polymerization also generally includes: chain transfer agents, suspension stabilizers, and polymerization catalysts. Typical chain transfer agents include: dimeric α-methylstyrene. After polymerization, the polymer is generally present in an amount of from about 93 to 98 weight percent based on the weight of the bead.

Blowing agents suitable for the present invention generally comprise $C_3$–$C_6$ hydrocarbons and mixtures thereof, with pentane isomers being preferred. The blowing agent must have a boiling point below that of the melting point of the polymer so that upon heating of the expandable polystyrene beads the blowing agent will vaporize and leave the beads thereby expanding the bead. Generally a boiling point below 70° C. is preferred. Suitable blowing agents include, for example: propane; butane; isobutane; n-pentane; isopentane; neopentane; cyclopentane; methylcyclopentane; 2-methyl pentane; 3-methyl pentane; 2,2-dimethylbutane; 2,3-dimethylbutane; pentane petroleum distillate fractions; hexane; cyclohexane; methylcyclohexane; and hexane isomers. Blowing agents are generally used at levels of from about 2 to about 5 weight percent, more preferably from about 2.5 to about 4 weight percent based on the total weight of the bead.

As discussed above, the suspension polymerization usually is carried out in the presence of suspension stabilizers and polymerization catalysts. Common suspension stabilizers include: molecular colloids, such as, polyvinyl alcohol (PVA) and polyvinyl pyrrolidone (PVP); the pickering salts such as $Ca_3(PO_4)_2$ in combination with an extender such as dodecylbenzol sulfate. Typical polymerization catalysts include radical catalysts such as dibenzoylperoxide, tert-butyl perbenzoate, and dicumyl peroxide. Other suitable catalysts are well known to one of ordinary skill in the art.

The expandable polystyrene beads can also include other additives like flame retardants based on organic bromo or chloro compounds, such as, tris(dibromopropyl) phosphate, hexabromocyclododecane, chloroparaffin. Other additives include antistatic agents, stabilizers, dyes, lubricants, and fillers. To aid in demolding the object formed from the expandable polystyrene beads one may also include compounds like glycerine ester, hydroxycarboxylic acid ester.

As discussed above, typical anti-lumping agents include zinc stearate, melamine formaldehyde condensates of silica gel, glycerol mono stearate, ethylene-bis stearamide (acrawax), and silica. The typical agents are not effective when expanding beads to lower densities or when using the indicated low levels of blowing agents. The present invention discloses a new class of anti-lumping agents that are block copolymers.

By the term block copolymers it is meant a polymer having blocks formed of a plurality of a repeating unit, such as ethylene oxide (EO), that are attached to additional blocks of a plurality of another repeating unit, such as, propylene oxide (PO). A given anti-lumping copolymer may comprise a series of these blocks in an arrangement such as: $EO_x$-$PO_y$; $EO_x$-$PO_y$-$EO_z$; $PO_x$-$EO_y$-$PO_z$; etc. The particular arrangement of the blocks along with the overall HLB value for the polymer are important characteristics. It is preferable to match the arrangement of the blocks to the overall hydrophobicity of the expandable bead. In other words, when the bead is more hydrophilic, then an arrangement of $EO_x$-$PO_y$-$EO_z$ is beneficial. When the bead is more lipophilic, then an arrangement of $PO_x$-$EO_y$-$PO_z$ is more beneficial. In general, it is preferable that the amount of EO, which is generally hydrophilic, in the block copolymer range between about 65 and 80% by weight based on the total weight of the copolymer. The amount of PO, which is generally lipophilic, is preferably from about 20 to 35% based on the total weight of the copolymer. It is preferable that the number average molecular weight of the copolymer be from approximately 4,000 to 15,000, preferably from about 6,000 to 11,000, most preferably from about 7,000 to 10,000. In general, the viscosity of these copolymers is from about 450 to 2,500 cps at 77° C., provided they are in a solid form at 20° C. The melt point of the copolymers ranges from approximately 45 to 60° C.

In general, it is preferable that the HLB value of the copolymer range from about 16 to 29, depending on the surface characteristics of the bead as discussed above, when it is utilized to coat an expandable polystyrene bead prepared by an aqueous suspension reaction. The HLB value is a semi-empirical number determined from the weight percentage of hydrophilic groups to lipophilic groups within a molecule or mixture. The value is a general indication of the polarity of the molecules and ranges from 1 to 40. The HLB value increases with increasing hydrophilicity. Preferred HLB values of the block copolymers are from about 19-29, and most preferably from about 24 to 29.

Methods for formation of the block copolymers described above are well known in the art and will only briefly be described. Typically, one utilizes an initiator molecule such as a lower molecular polyhydroxyl or polyamine initiator molecule. By way of example, the initiator can be a diol, triol, diamine or triamine. Examples include propylene glycol, ethylene glycol, glycerol, and ethylenediamine. The initiator is utilized in an alkali-catalyzed polymerization reaction with alkylene oxide compounds such as ethylene oxide or propylene oxide to generate a polyetherol. When one carries out the alkali-catalyzed polymerization sequentially using only a single alkylene oxide at a time, one can form block copolymer polyetherols that are useful as the anti-lumping agents of the present invention. One can also utilize amines such as ethylenediamine as the initiator in these reactions. Suitable block copolymers include the Pluronic® or Pluronic R® copolymer series produced by BASF Corporation. Preferred block copolymers include the PLURONIC F68 and F108 products.

After formation of the polystyrene beads they are separated from the aqueous phase, washed and dried. One method of drying the beads is to pass them into a screw conveyor that feeds a heated airveyor for flash drying. One method for application of the new anti-lumping agents is to add it to the beads in the screw conveyor. Some mixing occurs in the screw conveyor and the rest occurs in the flash dryer. The block copolymer anti-lumping agent can be added alone or with other anti-lumping agents. The anti-lumping agent is generally incorporated into the polymer bead in an amount of from about 250 to 2500 ppm, based on the weight of the polymer. Preferably, the anti-lumping agent is present in an amount of from about 300 to 1250 ppm.

Once dried the beads are sized into fractions. The formed beads generally have a diameter of from about 0.2 to 4.0 mm. Another method for adding the new block copolymer anti-lumping agents to the beads comprises adding the agent to a powder blending system after sizing of the beads. These blending systems typically include a plow blade mixer such as the Littleford FKM mixers. The anti-lumping agent and other additives are combined with the beads and mixed using a plow blade mixer.

The initial expansion of the beads is generally carried out in a closed vessel batch expander with a steam injection process. Typical examples of such expanders include: Weiser VN400, Kurtz KV1000, and Dingledein VA2000. The beads are passed through the expander and are heated such that the blowing agent vaporizes thereby expanding the beads. The flow rate of the beads through the expander determines the amount of expansion and it is generally reported as pounds per hour per cubic foot of expander volume, or for a given expander as pounds per hour. During the initial expansion stage lumping of the expanding polystyrene beads can occur. To achieve low density polystyrene beads the expansion time must be increased, but in the past increasing the expansion time has also increased the amount of lumping. With the anti-lumping agent of the present invention it is possible to achieve low density polystyrene beads without an increase in the amount of lumping. As explained above, when the beads lump, they can be difficult to use in a subsequent molding process.

EXAMPLE 1

To demonstrate the effectiveness of the block copolymer anti-lumping agents of the present invention, a series of expandable polystyrene beads containing from about 2% to about 5% by weight, based on the total weight of the bead, of a $C_3$ to $C_6$ hydrocarbon blowing agent are prepared in the presence or absence of PLURONIC F68 (F68). PLURONIC F68 is formed by initially adding propylene oxide (PO) to the hydroxyl groups of propylene glycol initiator molecule to form a PO block, then ethylene oxide (EO) is added to the reactive ends of the PO block and polymerization continues to form a structure of $EO_x$-$PO_y$-$EO_z$. This block copolymer has 80% by weight EO and 20% by weight PO, a number average molecular weight of 8400, an HLB of 29, a melt point of 52° C. and a viscosity of 1000 at 77° C. The F68 was present in an amount of 1000 ppm based on the total weight of the unexpanded beads. The aqueous suspension reaction for formation of the expandable beads is carried out using a typical aqueous suspension polymerization. The PLURONIC F68 is added to the beads by adding it to a powder blending system after sizing of the beads. The blending system included a plow blade Littleford FKM mixer.

The expandable beads formed utilizing the above-referenced aqueous suspensions are then tested for lumping, the minimal density that could be formed during the initial expansion step (prepuffs) and the maximal rate at which the beads could be expanded during the initial step. In addition, each sample is tested for a number of parameters during a molding step including the average cycle time for a block mold and the average cycle time for a shaped mold. The results of these experiments are presented in Table I below:

TABLE 1

| Measured Property | 1 | 2 | 3 |
|---|---|---|---|
| Minimal density in pcf; w/out F68. | 0.90 | 0.88 | 1.05 |
| Maximal flow rate in lbs/hr w/out F68 | 300 | 320 | 244 |
| Minimal density in pcf with F68 | 0.86 | 0.90 | 1.00 |
| Maximal flow rate in lbs/hr with F68 | 315 | 342 | 315 |
| Average cycle time, block mold w/out F68 | 7–10 mins. | 7–10 mins. | Not determined |
| Average cycle time shaped mold w/out F68 | 100 secs. | 80–100 secs. | 55 secs. |
| Cycle time shaped mold with F68 | 55 secs. | 92 secs. | 65–110 secs. |
| Lumping w/out F68 % by weight of the expanded beads | 5.0–10.0 | 10.0–15.0 | 10.0–20.0 |
| Lumping with F68 % by weight of the expanded beads | 0.0 | 0.0 | 0.0 |

The data in the Table I demonstrate that PLURONIC F68 utilized in an amount of 1000 ppm enables one to form a prepuff having a similar or lower density than that obtainable without F68 and to form the prepuff at a much higher rate. Thus, inclusion of the PLURONIC F68 anti-lumping agent increases the rate of formation of prepuff. In addition, inclusion of the F68 permitted a faster cycle time during the molding step when molding a shape. In addition, the data clearly show the complete prevention of lumping by inclusion of the PLURONIC F68. The amount of lumping in the absence of the anti-lumping agent of the present invention was significant.

Thus, use of these anti-lumping agents will enable one to create prepuffs with no lumping, at a faster rate and to substantially reduce the average cycle time for the molding step, thereby leading to faster production of molded parts.

The foregoing invention has been described in accordance with the relevant legal standards; thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A method for the formation of an expandable bead comprising the steps of:
    a) forming an expandable polystyrene bead containing from about 2% to about 5% by weight, based on the total weight of the bead, of a $C_3$ to $C_6$ hydrocarbon blowing agent; and
    b) coating the expandable polystyrene bead with an anti-lumping agent comprising a block copolymer comprising blocks of ethylene oxide and propylene oxide, wherein the block copolymer comprises from about 80% to 65% by weight ethylene oxide and from about 20% to 35% by weight propylene oxide, based on the total weight of the copolymer, and has a hydrophilic-lipophilic balance (HLB) value of from 19 to 29 said anti-lumping agent present in an amount of from 250 to 2500 ppm based on the weight of the bead.

2. A method as recited in claim 1, wherein step a) is further defined by forming the expandable polystyrene bead by polymerizing a monomer comprising at least one of styrene, alpha-methylstyrene, o-methylstyrene, m-methylstyrene, p-methylstyrene, ar-ethylstyrene, ar-vinylxylene, ar-chlorostyrene, ar-bromostyrene, vinyltoluenes, mono- and polyhalogenated vinyltoluenes, acrylonitrile, and methyl methacrylate.

3. A method as recited in claim 1, wherein the expandable polystyrene bead comprises polystyrene.

4. A method as recited in claim 1, wherein step b) is further defined by providing the anti-lumping agent in an amount of from about 300 to 1250 ppm.

5. A method as recited in claim 1, wherein the block copolymer has a number average molecular weight of from about 4,000 to 15,000.

6. A method as recited in claim 1, wherein the block copolymer has a number average molecular weight of from about 7,000 to 10,000.

7. A method as recited in claim 1, having a density of from about 1.5 to 0.75 pounds per cubic foot.

8. A method as recited in claim 1, having a density of from about 1.2 to 0.85 pounds per cubic foot.

9. A method as recited in claim 1, wherein the blowing agent comprises at least one of propane; butane; isobutane; n-pentane; isopentane; neopentane; cyclopentane; methylcyclopentane; 2-methyl pentane; 3-methyl pentane; 2,2-dimethylbutane; 2,3-dimethylbutane; pentane petroleum distillate fractions; hexane; cyclohexane; methylcyclohexane; and hexane isomers.

10. A method as recited in claim 1, wherein the blowing agent is present in an amount of from about 2.5% to about 4% by weight, based on the total weight of the bead.

11. A method as recited in claim 1, wherein said block copolymer has an HLB value of from about 24 to 29.

12. A method as recited in claim 1, wherein step b) is further defined by combining the expandable bead formed in step a) with the anti-lumping agent in a screw conveyor, thereby coating the bead with the anti-lumping agent.

13. A method as recited in claim 1, wherein step b) is further defined by combining the expandable bead formed in step a) with the anti-lumping agent in a plow blade mixer, thereby coating the bead with the anti-lumping agent.

* * * * *